(12) United States Patent
Ling et al.

(10) Patent No.: US 11,962,388 B2
(45) Date of Patent: Apr. 16, 2024

(54) BEAM CONFIGURATION METHOD AND APPARATUS

(71) Applicant: Huawei Technologies Co., Ltd., Shenzhen (CN)

(72) Inventors: Cen Ling, Shanghai (CN); Yong Cheng, Lanzhou (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 138 days.

(21) Appl. No.: 17/626,772

(22) PCT Filed: Jul. 13, 2020

(86) PCT No.: PCT/CN2020/101663
§ 371 (c)(1),
(2) Date: Jan. 12, 2022

(87) PCT Pub. No.: WO2021/008495
PCT Pub. Date: Jan. 21, 2021

(65) Prior Publication Data
US 2022/0294519 A1 Sep. 15, 2022

(30) Foreign Application Priority Data
Jul. 12, 2019 (CN) .......................... 201910628956.9

(51) Int. Cl.
*H04B 7/02* (2018.01)
*H04B 7/08* (2006.01)
*H04W 16/28* (2009.01)

(52) U.S. Cl.
CPC ............ *H04B 7/088* (2013.01); *H04W 16/28* (2013.01)

(58) Field of Classification Search
CPC .... H04B 7/088; H04B 7/0695; H04B 7/0408; H04W 16/28
(Continued)

(56) References Cited

U.S. PATENT DOCUMENTS 7,570,211 B1 8/2009 Jensen et al.
9,515,714 B2 * 12/2016 Jeong ................... H04B 7/0617
(Continued)

FOREIGN PATENT DOCUMENTS

CN 101867398 A 10/2010
CN 102571178 A 7/2012
(Continued)

OTHER PUBLICATIONS

"UE antenna assumption and beam modeling for NTN," 3GPP TSG RAN WG1 Meeting #92, R1-1802551, Athens, Greece, pp. 1-7, 3rd Generation Partnership Project, Valbonne, France (Feb. 26-Mar. 2, 2018).
(Continued)

*Primary Examiner* — Helene E Tayong
(74) *Attorney, Agent, or Firm* — Leydig, Voit & Mayer, Ltd.

(57) ABSTRACT

Embodiments of this application provide a beam configuration method and apparatus. The method includes: determining base station scheduling information rank, and determining a direction of arrival power spectrum; determining peak information based on the direction of arrival power spectrum; determining, based on the peak information, beam directions that meet power conditions; selecting, based on a preset filtering condition, at least one candidate beam direction from the beam directions that meet the power conditions; and determining a target beam direction of a terminal from the at least one candidate beam direction based on the base station scheduling information rank, a value of a channel quality indicator CQI, and the direction of arrival power spectrum. In this way, a beam configuration manner on a terminal side is more flexible, to meet requirements of different service scenarios, and improve stability of a communications link.

20 Claims, 9 Drawing Sheets

(58) Field of Classification Search
USPC .......................................................... 375/267
See application file for complete search history.

(56) References Cited

U.S. PATENT DOCUMENTS

| | | |
|---|---|---|
| 2016/0218779 A1 | 7/2016 | Lee et al. |
| 2018/0083679 A1 | 3/2018 | Lim et al. |
| 2018/0167116 A1 | 6/2018 | Rahman et al. |
| 2018/0288645 A1* | 10/2018 | Lee ..................... H04B 17/382 |

FOREIGN PATENT DOCUMENTS

| | | |
|---|---|---|
| CN | 106850007 A | 6/2017 |
| CN | 106850016 A | 6/2017 |
| CN | 109644494 A | 4/2019 |
| JP | 2007006365 A | 1/2007 |
| WO | 2018082904 A1 | 5/2018 |
| WO | 2020216159 A1 | 10/2020 |

OTHER PUBLICATIONS

"3rd Generation Partnership Project; Technical Specification Group Radio Access Network; Study on New Radio Access Technology Physical Layer Aspects (Release 14)," 3GPP TR 38.802 V14.2.0, pp. 1-144, 3rd Generation Partnership Project, Valbonne, France (Sep. 2017).

* cited by examiner

BEAM CONFIGURATION METHOD AND APPARATUS

CROSS-REFERENCE TO RELATED APPLICATIONS

This application is a national stage of International Application No. PCT/CN2020/101663, filed on Jul. 13, 2020, which claims priority to Chinese Patent Application No. 201910628956.9, filed on Jul. 12, 2019. Both of the aforementioned applications are hereby incorporated by reference in their entireties.

TECHNICAL FIELD

Embodiments of this application relate to the field of communications technologies, and in particular, to a beam configuration method and apparatus.

BACKGROUND

In 5G high frequency communication, both a base station side and a user equipment side send and receive a signal in a form of beamforming. To improve link stability in 5G millimeter wave communication, a plurality of antenna arrays are usually disposed on the user equipment side. Each antenna array may simultaneously transmit one or more beams. However, a quantity of beams used by user equipment, direction selection of each beam, configuration of a polarization mode of a beam, and the like greatly affect a transmission rate, power consumption, and service stability of the user equipment.

Currently, two antenna arrays are usually installed on the user equipment, and each array transmits one beam. In addition, two beams are set to have a same direction but different polarization modes.

However, the foregoing setting manner is simple, and requirements of base station scheduling information, channel quality, and the like on beam configuration are not considered. Consequently, the beam configuration is not adapted to a specific service scenario, and stability of an entire communications link is affected.

SUMMARY

Embodiments of this application provide a beam configuration method and apparatus, so that a beam configuration manner on a terminal side can be more flexible, to meet requirements of different service scenarios, and improve stability of a communications link.

According to a first aspect, the embodiments of this application provide a beam configuration method. The method includes:
determining base station scheduling information rank, and determining a direction of arrival power spectrum;
determining peak information based on the direction of arrival power spectrum;
determining, based on the peak information, beam directions that meet power conditions;
selecting, based on a preset filtering condition, at least one candidate beam direction from the beam directions that meet the power conditions; and
determining a target beam direction of a terminal from the at least one candidate beam direction based on the base station scheduling information rank, a value of a channel quality indicator CQI, and the direction of arrival power spectrum.

In this embodiment, service scenarios are comprehensively considered, the base station scheduling information rank is determined, and the direction of arrival power spectrum is determined. The peak information is determined based on the direction of arrival power spectrum. The beam directions that meet the power conditions are determined based on the peak information. The at least one candidate beam direction is selected, based on the preset filtering condition, from the beam directions that meet the power conditions. The target beam direction of the terminal is determined from the at least one candidate beam direction based on the base station scheduling information rank, the value of the channel quality indicator CQI, and the direction of arrival power spectrum. In this way, a beam configuration manner on a terminal side is more flexible, to meet requirements of different service scenarios, and improve stability of a communications link.

Optionally, the determining base station scheduling information rank includes:
receiving the base station scheduling information rank sent by a base station.

In this embodiment, because the base station scheduling information is preconfigured, the terminal side may alternatively query configuration parameters of the base station to obtain the base station scheduling information rank. Therefore, a corresponding beam configuration solution may be designed based on different base station scheduling information rank.

Optionally, the determining a direction of arrival power spectrum includes:
when a direction of a beam that is transmitted by a base station is fixed, obtaining reference signal received powers in different beam directions, where the reference signal received powers in the different beam directions form the direction of arrival power spectrum.

Optionally, the determining a direction of arrival power spectrum includes:
obtaining the direction of arrival power spectrum through beam sweeping, or obtaining the direction of arrival power spectrum through non-coherent channel estimation.

Optionally, the peak information includes peak powers, a maximum peak power, and an angular distance between adjacent peak powers.

Optionally, the power conditions are: A peak power is greater than rsrp-ThresholdSSB in an RRC higher layer parameter RACH-ConfigCommon that is delivered by the base station to the terminal, an absolute value of a difference between the peak power and the maximum peak power is less than or equal to a first preset threshold, and the angular distance between adjacent peak powers is greater than a beam direction corresponding to a peak power of a beam width of the terminal.

In this embodiment, a beam direction that meets the conditions may be searched based on the power conditions, so that a beam direction with better signal transmission quality is selected by comprehensively considering factors such as the peak powers, the angular distance between adjacent peak powers, and the maximum peak power.

Optionally, the selecting, based on a preset filtering condition, at least one candidate beam direction from the beam directions that meet the power conditions includes:
determining a quantity of candidate beams based on an upper limit of a quantity of beams that are simultaneously supported by the terminal and a quantity of beams that meet the power conditions, where the quantity of candidate beams is a minimum value of the upper limit of the quantity of beams that are simultaneously supported by the terminal and the quantity of beams that meet the power conditions; and selecting, based on the quantity of candidate beams in descending order of powers, the candidate beam direction from the beam directions that meet the power conditions.

In this embodiment, the quantity of candidate beams is determined based on the upper limit of the quantity of beams that are simultaneously supported by the terminal and the quantity of beams that meet the power conditions, so that the optimal quantity of beams can be selected on the premise that a requirement of the terminal device is met.

Optionally, the method further includes: determining a polarization mode in the target beam direction based on a power relationship between horizontal polarization and vertical polarization.

Optionally, the determining a polarization mode in the target beam direction based on a power relationship between horizontal polarization and vertical polarization includes:

receiving, in a vertical polarization mode and a horizontal polarization mode in the target beam direction, a reference signal sent by the base station;

obtaining a received power RSRP_{V} of the reference signal in a vertical polarization direction and a received power RSRP{H} of the reference signal in a horizontal polarization direction; and determining the polarization mode in the target beam direction based on max(RSRP_{H}, RSRP_{V}).

In this embodiment, the reference signal is received in two different polarization modes in the target beam direction, and the polarization mode in the target beam direction is determined by comparing the received powers of the reference signal, to select a polarization mode with a better receiving effect, and improve signal transmission quality.

Optionally, the determining target beam direction of a terminal from the at least one candidate beam direction based on the base station scheduling information rank, a value of a channel quality indicator CQI, and the direction of arrival power spectrum includes:

if a value of the base station scheduling information rank is 1 and the value of the channel quality indicator CQI is greater than a second preset threshold, selecting a candidate beam direction with a strongest power as the target beam direction.

Optionally, the determining target beam direction of a terminal from the at least one candidate beam direction based on the base station scheduling information rank, a value of a channel quality indicator CQI, and the direction of arrival power spectrum includes:

if a value of the base station scheduling information rank is not 1, and/or the value of the channel quality indicator CQI is not greater than a second preset threshold, determining the target beam direction based on the quantity of candidate beams.

In this embodiment, the target beam direction is determined by using the base station scheduling information and/or the value of the channel quality indicator CQI, to flexibly select a quantity of channels, and reduce power consumption for signal transmission.

Optionally, the determining the target beam direction based on the quantity of candidate beams includes:

if the quantity of candidate beams is 1, using the candidate beam direction as the target beam direction.

Optionally, the method further includes:

receiving, in a vertical polarization mode and a horizontal polarization mode in the target beam direction, a reference signal sent by the base station; and obtaining a received power RSRP_{V} of the reference signal in a vertical polarization direction and a received power RSRP{H} of the reference signal in a horizontal polarization direction.

Optionally, the method further includes:

if an absolute value of a difference between the RSRP_{V} and the RSRP_{H} is greater than a third preset threshold, setting a first beam and a second beam in the target beam direction, where a direction of the first beam and a direction of the second beam are the same, and polarization modes in the direction of the first beam and the direction of the second beam are different;

reporting that a value of the rank is 1 to the base station, and when the value of the base station scheduling information rank is 1, selecting the direction of the first beam or the direction of the second beam as the target beam direction; and determining the polarization mode in the target beam direction based on max(RSRP_{H}, RSRP_{V}).

In this embodiment, when the value of the base station scheduling information rank is 1, the direction of the first beam or the direction of the second beam may be selected as the target beam direction, to reduce power consumption for signal transmission as much as possible while a signal transmission effect is ensured.

Optionally, the method further includes:

if an absolute value of a difference between the RSRP_{V} and the RSRP{H} is not greater than a third preset threshold, setting a first beam and a second beam in the target beam direction, where a direction of the first beam and a direction of the second beam are the same; when a polarization mode in the direction of the first beam is vertical polarization, setting a polarization mode in the direction of the second beam to horizontal polarization; or when a polarization mode in the direction of the first beam is horizontal polarization, setting a polarization mode in the direction of the second beam to vertical polarization.

In this embodiment, when two beams are used, beams in different directions may be used based on channel quality, to reduce a probability of a failure of beam failure recovery. This embodiment is especially applicable to a case in which user equipment UE moves.

Optionally, the determining the target beam direction based on the quantity of candidate beams includes:

if the quantity of candidate beams is greater than 1, using all candidate beam directions as target beam directions.

Optionally, the method further includes:

receiving, in a vertical polarization mode and a horizontal polarization mode in each target beam direction, a reference signal sent by the base station;

obtaining a received power RSRP_{V} of the reference signal in a vertical polarization direction and a received power RSRP{H} of the reference signal in a horizontal polarization direction; and determining a polarization mode in each target beam direction based on max(RSRP_{H}, RSRP_{V}).

In this embodiment, a flexible polarization configuration manner may be used based on channel quality, to improve a transmission rate of user equipment UE and increase the number of streams.

According to a second aspect, the embodiments of this application provide a beam configuration apparatus, including:

a processing module and a storage module, where the storage module is configured to be coupled to the processing module, and store necessary program instructions and data.

The processing module is configured to:

determine base station scheduling information rank, and determine a direction of arrival power spectrum;

determine peak information based on the direction of arrival power spectrum;

determine, based on the peak information, beam directions that meet power conditions;

select, based on a preset filtering condition, at least one candidate beam direction from the beam directions that meet the power conditions; and determine a target beam direction of a terminal from the at least one candidate beam direction based on the base station scheduling information rank, a value of a channel quality indicator CQI, and the direction of arrival power spectrum.

Optionally, the apparatus further includes:

a receiving module, configured to receive the base station scheduling information rank sent by a base station.

Optionally, the processing module is further configured to:

when a direction of a beam that is transmitted by a base station is fixed, obtaining reference signal received powers in different beam directions, where the reference signal received powers in the different beam directions form the direction of arrival power spectrum.

Optionally, the processing module is further configured to:

obtain the direction of arrival power spectrum through beam sweeping, or obtain the direction of arrival power spectrum through non-coherent channel estimation.

Optionally, the peak information includes peak powers, a maximum peak power, and an angular distance between adjacent peak powers.

Optionally, the power conditions are: A peak power is greater than rsrp-ThresholdSSB in an RRC higher layer parameter RACH-ConfigCommon that is delivered by the base station to the terminal, an absolute value of a difference between the peak power and the maximum peak power is less than or equal to a first preset threshold, and the angular distance between adjacent peak powers is greater than a beam direction corresponding to a peak power of a beam width of the terminal.

Optionally, the processing module is further configured to:

determine a quantity of candidate beams based on an upper limit of a quantity of beams that are simultaneously supported by the terminal and a quantity of beams that meet the power conditions, where the quantity of candidate beams is a minimum value of the upper limit of the quantity of beams that are simultaneously supported by the terminal and the quantity of beams that meet the power conditions; and select, based on the quantity of candidate beams in descending order of powers, the candidate beam direction from the beam directions that meet the power conditions.

Optionally, the processing module is further configured to:

determine a polarization mode in the target beam direction based on a power relationship between horizontal polarization and vertical polarization.

Optionally, the processing module is specifically configured to: receive, in a vertical polarization mode and a horizontal polarization mode in the target beam direction, a reference signal sent by the base station;

obtain a received power $RSRP\_\{V\}$ of the reference signal in a vertical polarization direction and a received power $RSRP\{H\}$ of the reference signal in a horizontal polarization direction; and determine the polarization mode in the target beam direction based on $\max(RSRP\_\{H\}, RSRP\_\{V\})$.

Optionally, the processing module is further configured to:

if a value of the base station scheduling information rank is 1 and the value of the channel quality indicator CQI is greater than a second preset threshold, select a candidate beam direction with a strongest power as the target beam direction.

Optionally, the processing module is further configured to:

if a value of the base station scheduling information rank is not 1, and/or the value of the channel quality indicator CQI is not greater than a second preset threshold, determine the target beam direction based on the quantity of candidate beams.

Optionally, the determining the target beam direction based on the quantity of candidate beams includes:

if the quantity of candidate beams is 1, using the candidate beam direction as the target beam direction.

Optionally, the processing module is further configured to:

receive, in a vertical polarization mode and a horizontal polarization mode in the target beam direction, a reference signal sent by the base station; and obtain a received power $RSRP\_\{V\}$ of the reference signal in a vertical polarization direction and a received power $RSRP\{H\}$ of the reference signal in a horizontal polarization direction.

Optionally, the processing module is further configured to:

if an absolute value of a difference between the $RSRP\_\{V\}$ and the $RSRP\{H\}$ is greater than a third preset threshold, set a first beam and a second beam in the target beam direction, where a direction of the first beam and a direction of the second beam are the same, and polarization modes in the direction of the first beam and the direction of the second beam are different;

report that a value of the rank is 1 to the base station, and when the value of the base station scheduling information rank is 1, select the direction of the first beam or the direction of the second beam as the target beam direction; and determine the polarization mode in the target beam direction based on $\max(RSRP\_\{H\}, RSRP\_\{V\})$.

Optionally, the processing module is further configured to:

if an absolute value of a difference between the $RSRP\_\{V\}$ and the $RSRP\{H\}$ is not greater than a third preset threshold, set a first beam and a second beam in the target beam direction, where a direction of the first beam and a direction of the second beam are the same; when a polarization mode in the direction of the first beam is vertical polarization, set a polarization mode in the direction of the second beam to horizontal polarization; or when a polarization mode in the direction of the first beam is horizontal polarization, set a polarization mode in the direction of the second beam to vertical polarization.

Optionally, the determining the target beam direction based on the quantity of candidate beams includes:

if the quantity of candidate beams is greater than 1, using all candidate beam directions as target beam directions.

Optionally, the processing module is further configured to:

receive, in a vertical polarization mode and a horizontal polarization mode in each target beam direction, a reference signal sent by the base station;

obtain a received power RSRP_{V} of the reference signal in a vertical polarization direction and a received power RSRP{H} of the reference signal in a horizontal polarization direction; and determine a polarization mode in each target beam direction based on max(RSRP_{H}, RSRP_{V}).

According to a third aspect, the embodiments of this application provide a beam configuration apparatus, including:

a module, a component, or a circuit configured to implement the beam configuration method in the first aspect.

According to a fourth aspect, the embodiments of this application provide a terminal, including a processor and a transceiver, where the processor and the transceiver are configured to perform the beam configuration method according to the first aspect of the embodiments of this application.

According to a fifth aspect, the embodiments of this application provide a chip, including a memory and a processor. The memory is configured to store program instructions, and the processor is configured to invoke the program instructions in the memory to perform the beam configuration method according to the first aspect of the embodiments of this application.

According to a sixth aspect, the embodiments of this application provide a readable storage medium. The readable storage medium stores a computer program, and when the computer program is executed, the beam configuration method according to the first aspect of the embodiments of this application is implemented.

According to a seventh aspect, the embodiments of this application provide a program product. The program product includes a computer program, and the computer program is stored in a readable storage medium. At least one processor of a communications apparatus may read the computer program from the readable storage medium, and the at least one processor executes the computer program, so that the communications apparatus implements the beam configuration method according to the first aspect of the embodiments of this application.

In this application, the base station scheduling information rank is determined, and the direction of arrival power spectrum is determined. The peak information is determined based on the direction of arrival power spectrum. The beam directions that meet the power conditions are determined based on the peak information. The at least one candidate beam direction is selected, based on the preset filtering condition, from the beam directions that meet the power conditions. The target beam direction of the terminal is determined from the at least one candidate beam direction based on the base station scheduling information rank, the value of the channel quality indicator CQI, and the direction of arrival power spectrum. In this way, the beam configuration manner on the terminal side is more flexible, to meet requirements of different service scenarios, and improve stability of the communications link.

DESCRIPTION OF EMBODIMENTS

Figure 1:
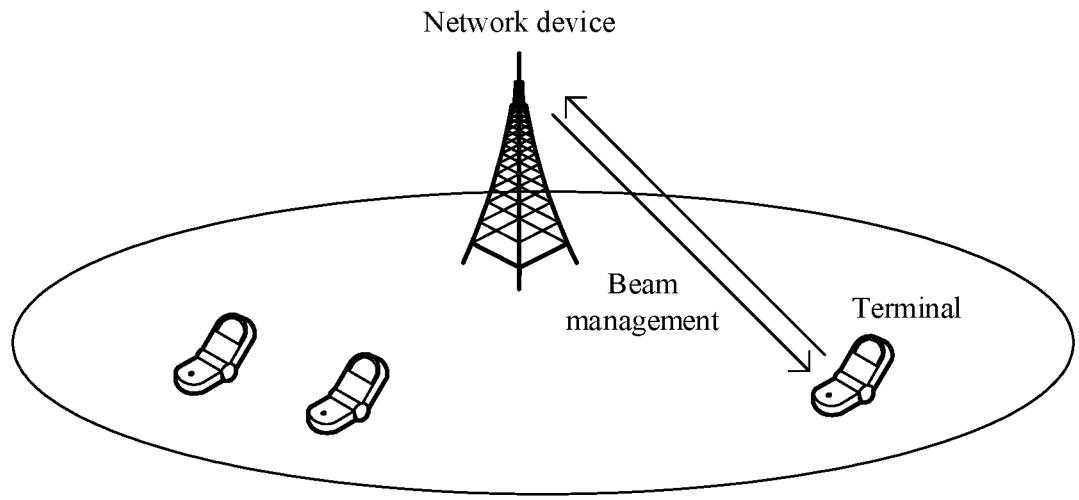
FIG. 1 is a schematic diagram of a structure of an application scenario according to an embodiment of this application.

FIG. 1 is a schematic diagram of a structure of an application scenario according to an embodiment of this application. As shown in FIG. 1, a network device and a terminal may be included. Beamforming is performed on a signal by using an antenna array, so that a precise narrow beam can provide a service for user data, to obtain a longer coverage distance and reduce signal interference. Therefore, in 5G high frequency communication, both a network device and a terminal side send and receive a signal in a beamforming manner. When the signal is sent and received in a beamforming manner, beam management is involved. In this embodiment of this application, when a beam direction on a network device side is fixed, a beam on a terminal side is optimally configured, to meet requirements of different service scenarios and improve stability of a communications link.

The following explains and describes some terms in this application, to help a person skilled in the art have an understanding.

A network device is also referred to as a radio access network (RAN) device, is a device that enables a terminal to access a wireless network, and may be an evolved NodeB (Evolutional NodeB, eNB or eNodeB) in long term evolution (LTE), a relay station or an access point, or a base station in a 5G network, for example, a transmission reception point (TRP) or a controller. This is not limited herein.

A terminal may be a wireless terminal or a wired terminal. The wireless terminal may refer to a device having a wireless transceiver function, and may be deployed on land, including indoor or outdoor devices, handheld devices, or vehicle-mounted devices; or may be deployed on a water surface (for example, on a steamboat); or may be deployed in the air (for example, on an airplane, a balloon, or a satellite). The terminal may be a mobile phone, a tablet computer (Pad), a computer having a wireless transceiver function, a virtual reality (VR) terminal, an augmented reality (AR) terminal, a wireless terminal in industrial control, a wireless terminal in self driving, a wireless terminal in telemedicine, a wireless terminal in smart grid, a wireless terminal in transportation safety, a wireless terminal in smart city, a wireless terminal in smart home), or the like. This is not limited herein. It may be understood that, in the embodiments of this application, the terminal may also be referred to as user equipment (UE).

Beam management is a basic feature of a millimeter wave protocol. In TR38.802, a key process of beam management is defined as L1/L2 procedures to obtain and maintain a set of beams that are used for uplink and downlink data transmission and reception, and includes beam determination, beam measurement, beam sweeping, and beam reporting. (1) The beam determination is a process in which a transmission and reception point (TRP) or user equipment (UE) selects an appropriate transmit/receive beam. A requirement of a UE end is: After receiving millimeter wave beams from a network side, the UE performs an alignment process, where the process includes downlink beam selection and uplink beam selection. Finally, the UE selects an optimal beam. The UE needs to meet beam reciprocity. (2) The beam measurement means: The UE receives a beamformed signal from the network side, where the signal includes beam information. A requirement of the UE end is: The beamformed signal of a network can be correctly measured, a beam measurement signal can be correctly reported, and other actions of the beam management can be performed based on a measurement result. (3) The beam sweeping means: In a spatial area, beams are transmitted and/or received during a time interval in a predetermined way. A requirement of the UE end is that the UE can sweep the beams during a time interval, and correctly process a sweeping result. (4) The beam reporting means: The UE reports information of beamformed signal based on the beam measurement. A requirement of the UE end is: The UE can report measurement information in different states based on a requirement of the network side, and take corresponding actions after a response is returned from the network side.

In the conventional technology, two antenna arrays are usually disposed on a UE end, each array transmits one beam. The two beams are set to have different polarization modes and a same beam direction. A specific service scenario, a channel condition, and a base station scheduling status are not considered in this setting manner, and an implementation form is simple. The beam directions of the two beams are always the same. Consequently, when reception of one beam fails, reception of the other beam also fails, and this affects link stability and robustness. In addition, a polarization characteristic of a channel is not considered in the conventional technology. For example, in some scenarios, a reference signal received power (RSRP) corresponding to a vertically polarized beam is much higher (or lower) than a reference signal received power corresponding to a horizontally polarized beam. In this case, a polarization mode with poor signal quality cannot work properly. In the conventional technology, base station scheduling information rank and a value of a channel quality indicator CQI are not considered, either. If the rank determined by the network and the channel is used for single-stream transmission, it is not necessary to transmit two beams at the same time. In conclusion, it can be learned that, the implementation form in the conventional technology is simple, and requirements of the base station scheduling information, channel quality, and the like on beam configuration are not considered. Consequently, the beam configuration is not adapted to a specific service scenario, and stability of an entire communications link is affected.

For a problem in the conventional technology, in this application, a service scenario is comprehensively considered, base station scheduling information rank is determined, and a direction of arrival power spectrum is determined. Peak information is determined based on the direction of arrival power spectrum. Beam directions that meet power conditions are determined based on the peak information. At least one candidate beam direction is selected, based on a preset filtering condition, from the beam directions that meet the power conditions. A target beam direction of a terminal is determined from the at least one candidate beam direction based on the base station scheduling information rank, a value of a channel quality indicator CQI, and the direction of arrival power spectrum. In this way, the beam configuration manner on a terminal side is more flexible, to meet requirements of different service scenarios, and improve stability of a communications link.

Figure 2:
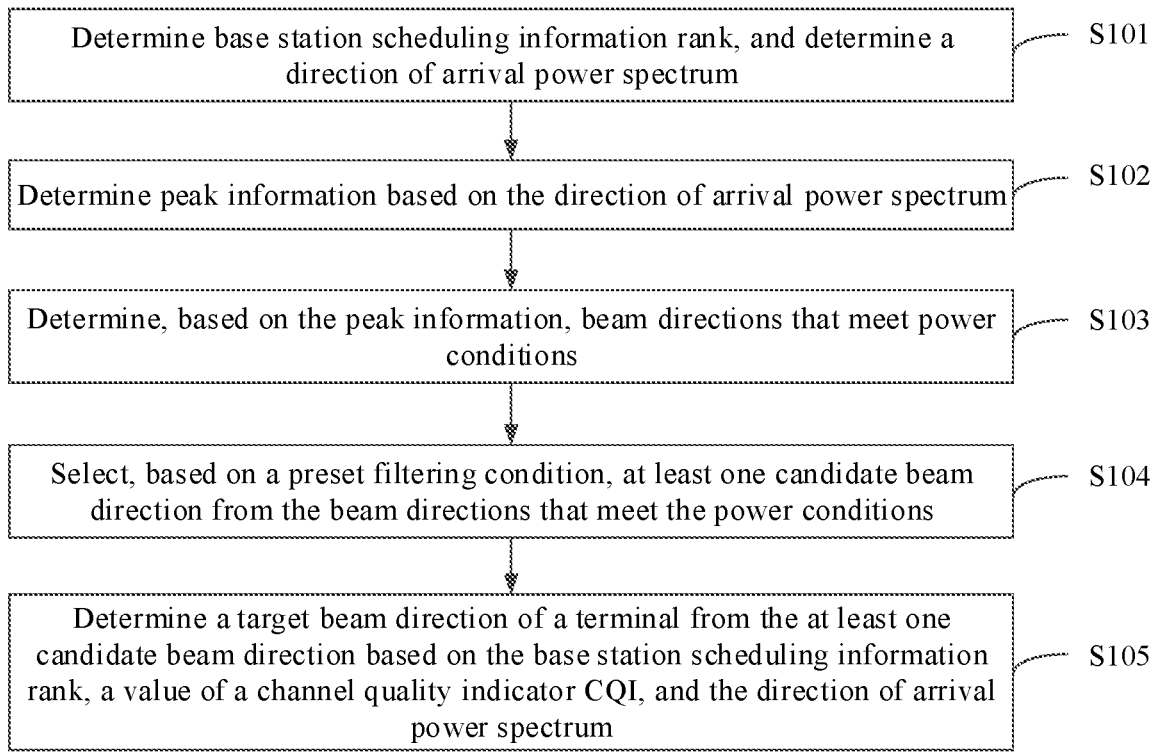
FIG. 2 is a schematic flowchart of a beam configuration method according to an embodiment of this application.

FIG. 2 is a schematic flowchart of a beam configuration method according to an embodiment of this application. As shown in FIG. 2, this embodiment may include the following steps.

Step S101: Determine base station scheduling information rank, and determine a direction of arrival power spectrum.

In this embodiment, a terminal side may directly obtain the base station scheduling information rank from a base station side. Because the base station scheduling information is preconfigured, the terminal side may alternatively query configuration parameters of the base station to obtain the base station scheduling information rank.

Figure 3:
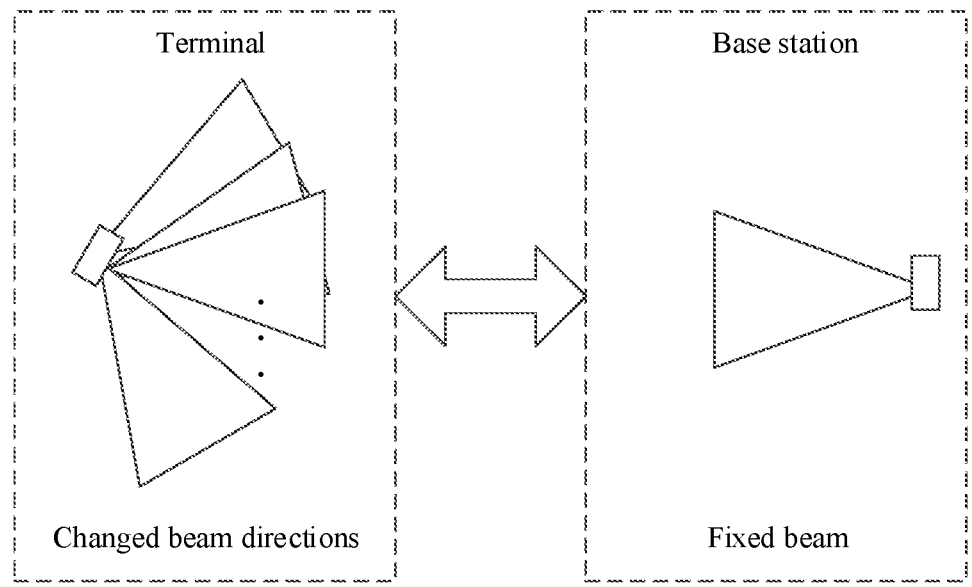
FIG. 3 is a schematic diagram of a principle of obtaining a direction of arrival power spectrum according to an embodiment of this application.

In this embodiment, the terminal side may obtain the direction of arrival power spectrum during beam sweeping in a P1 phase and/or a P3 phase. Specifically, the P3 phase (in the P3 phase, a beam of a network device is fixed) is used as an example for detailed description. FIG. 3 is a schematic diagram of a principle of obtaining the direction of arrival power spectrum according to an embodiment of this application. As shown in FIG. 3, in a preset time period, a beam direction on a network device side is fixed, and in the preset time period, the terminal side is controlled to adjust a beam direction based on a preset angle interval. Then, a reference signal received power is recorded in each beam direction, to obtain the direction of arrival power spectrum of a terminal. Specifically, in this embodiment, the terminal may alternatively obtain the direction of arrival power spectrum through non-coherent channel estimation. Specifically, because a direction of arrival power is related to channel signal fading, the direction of arrival power spectrum may be estimated based on a channel signal status.

Step S102: Determine peak information based on the direction of arrival power spectrum.

In this embodiment, corresponding peak information may be extracted from the direction of arrival power spectrum that is obtained in step S101. The peak information may include peak powers, a maximum peak power, and an angular distance between adjacent peak powers.

Figure 4:
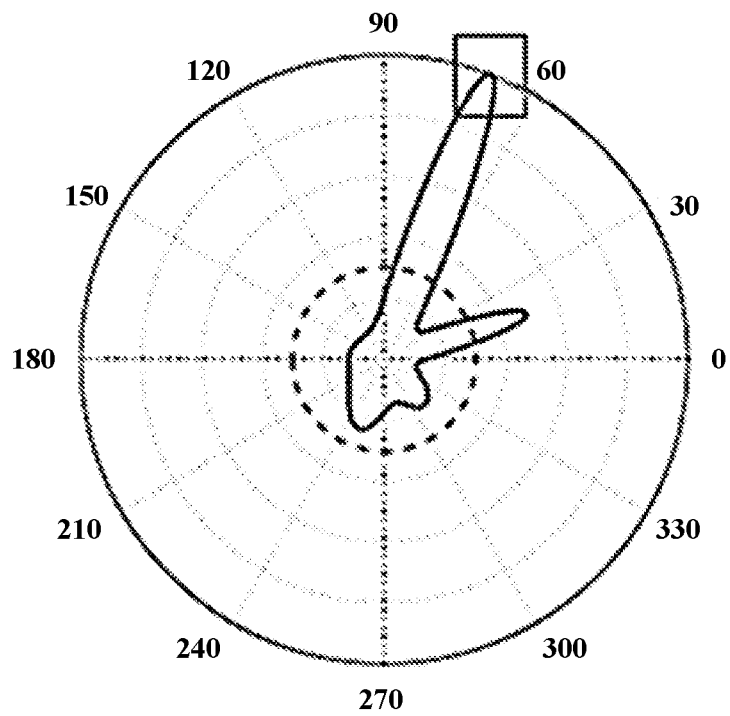
FIG. 4 is a schematic diagram of a direction of arrival power spectrum in a scenario according to an embodiment of this application.
Figure 5:
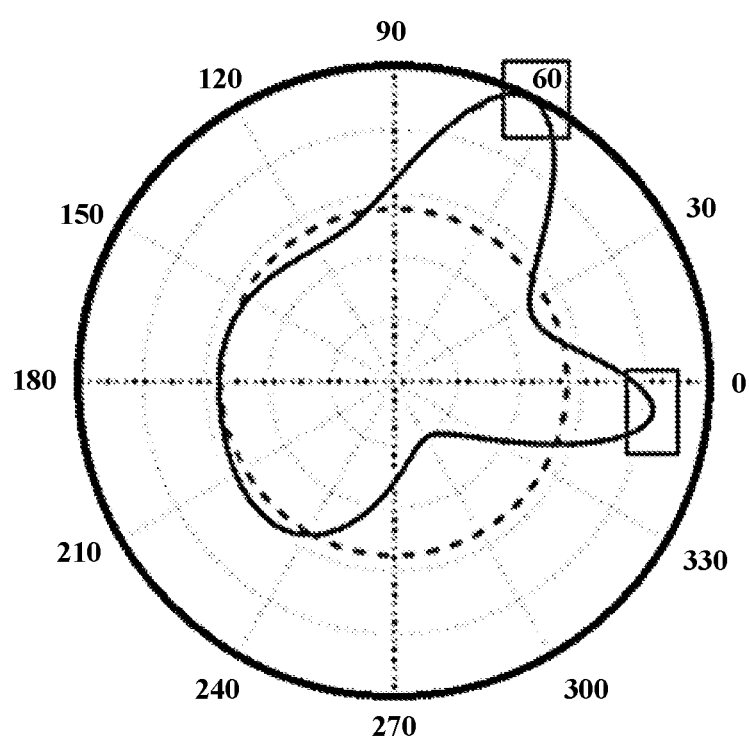
FIG. 5 is a schematic diagram of a direction of arrival power spectrum in another scenario according to an embodiment of this application.

Specifically, FIG. 4 is a schematic diagram of a direction of arrival power spectrum in a scenario according to an embodiment of this application. As shown in FIG. 4, in a line of sight (LoS) scenario and a strong reflection scenario, a power value difference between peak powers is relatively large, and an angular distance between peak powers is relatively small. FIG. 5 is a schematic diagram of a direction of arrival power spectrum in another scenario according to an embodiment of this application. As shown in FIG. 5, in complex reflection, scattering, and blocking scenarios, a power value difference between peak powers is relatively small, and an angular distance between peak powers is relatively large. Refer to FIG. 4 and FIG. 5. The peak powers, the maximum peak power, and the angular distance between adjacent peak powers may be directly extracted from the direction of arrival power spectrum.

Step S103: Determine, based on the peak information, beam directions that meet power conditions.

In this embodiment, the peak information is obtained based on the direction of arrival power spectrum. Then, angles corresponding to all peak powers that meet the power conditions are found based on the peak information, and the beam directions are determined based on the angles.

In this embodiment, the peak information may include the peak powers, the maximum peak power, and the angular distance between adjacent peak powers. Optionally, the power conditions include:

(1) A peak power is greater than rsrp-ThresholdSSB in an RRC higher layer parameter RACH-ConfigCommon that is delivered by the base station to the terminal.
(2) An absolute value of a difference between the peak power and the maximum peak power is less than or equal to a first preset threshold.
(3) The angular distance between adjacent peak powers is greater than a beam direction corresponding to a peak power of a beam width of the terminal.

It should be noted that a specific value of the first preset threshold is not limited in this embodiment. The value of the first preset threshold may be adjusted in different application scenarios or service requirements. In this embodiment, the first preset threshold may be set to 10 dB.

Specifically, refer to FIG. 4 and FIG. 5. In FIG. 4, there is one peak power that meets all the power conditions, and in FIG. 5, there are two peak powers that meet all the power conditions. Beam directions of peak powers that meet all the power conditions are recorded.

Step S104: Select, based on a preset filtering condition, at least one candidate beam direction from the beam directions that meet the power conditions.

In this embodiment, the at least one candidate beam direction may be selected, based on a beam capability supported by the terminal, from the beam directions that meet the power conditions.

Optionally, a quantity of candidate beams is determined based on an upper limit of a quantity of beams that are simultaneously supported by the terminal and a quantity of beams that meet the power conditions. The quantity of candidate beams is a minimum value of the upper limit of the quantity of beams that are simultaneously supported by the terminal and the quantity of beams that meet the power conditions. The candidate beam direction is selected, based on the quantity of candidate beams in descending order of powers, from the beam directions that meet the power conditions.

Specifically, it is assumed that a quantity of peak powers that meet the power conditions is B, and a maximum quantity of beams that can be simultaneously supported by the terminal is X, A=min(X, B), where A is the quantity of candidate beams.

Step S105: Determine a target beam direction of the terminal from the at least one candidate beam direction based on the base station scheduling information rank, a value of a channel quality indicator (CQI), and the direction of arrival power spectrum.

In this embodiment, the base station scheduling information rank and the value of the channel quality indicator CQI may be comprehensively considered when the target beam direction is selected. For example, a quantity of selected candidate beams is determined based on the base station scheduling information rank and the value of the channel quality indicator CQI. Then, a corresponding quantity of candidate beam directions are selected as target beam directions of the terminal based on the direction of arrival power spectrum in descending order of powers.

In this embodiment, the quantity of beams is flexibly selected based on a scheduling status and channel quality on the network device (base station) side, to select an optimal quantity of channels, and reduce transmission power consumption.

In this embodiment, the base station scheduling information rank is determined, and the direction of arrival power spectrum is determined. The beam directions that meet the power conditions are determined based on the peak information. The at least one candidate beam direction is selected, based on the preset filtering condition, from the beam directions that meet the power conditions. The target beam direction of the terminal is determined from the at least one candidate beam direction based on the base station scheduling information rank, the value of the channel quality indicator CQI, and the direction of arrival power spectrum. In this way, the beam configuration manner on a terminal side is more flexible, to meet requirements of different service scenarios, and improve stability of a communications link.

In a possible embodiment, after step S105, a polarization mode in the target beam direction is determined based on a power relationship between horizontal polarization and vertical polarization.

In this embodiment, in the target beam direction, a reference signal sent by the base station is received in a horizontal polarization mode and a vertical polarization mode, and then the polarization mode is determined based on powers of the reference signal.

Optionally, the reference signal sent by the base station is received in a vertical polarization mode and a horizontal polarization mode in the target beam direction. A received power RSRP_{V} of the reference signal in a vertical polarization direction and a received power RSRP{H} of the reference signal in a horizontal polarization direction are obtained. A polarization mode in the target beam direction is determined based on max(RSRP_{H}, RSRP_{V}). If the received power in the vertical polarization mode is greater than the received power in the horizontal polarization mode, the polarization mode in the target beam direction is set to vertical polarization. If the received power in the horizontal polarization mode is greater than the received power in the vertical polarization mode, the polarization mode in the target beam direction is set to horizontal polarization.

Figure 6A:
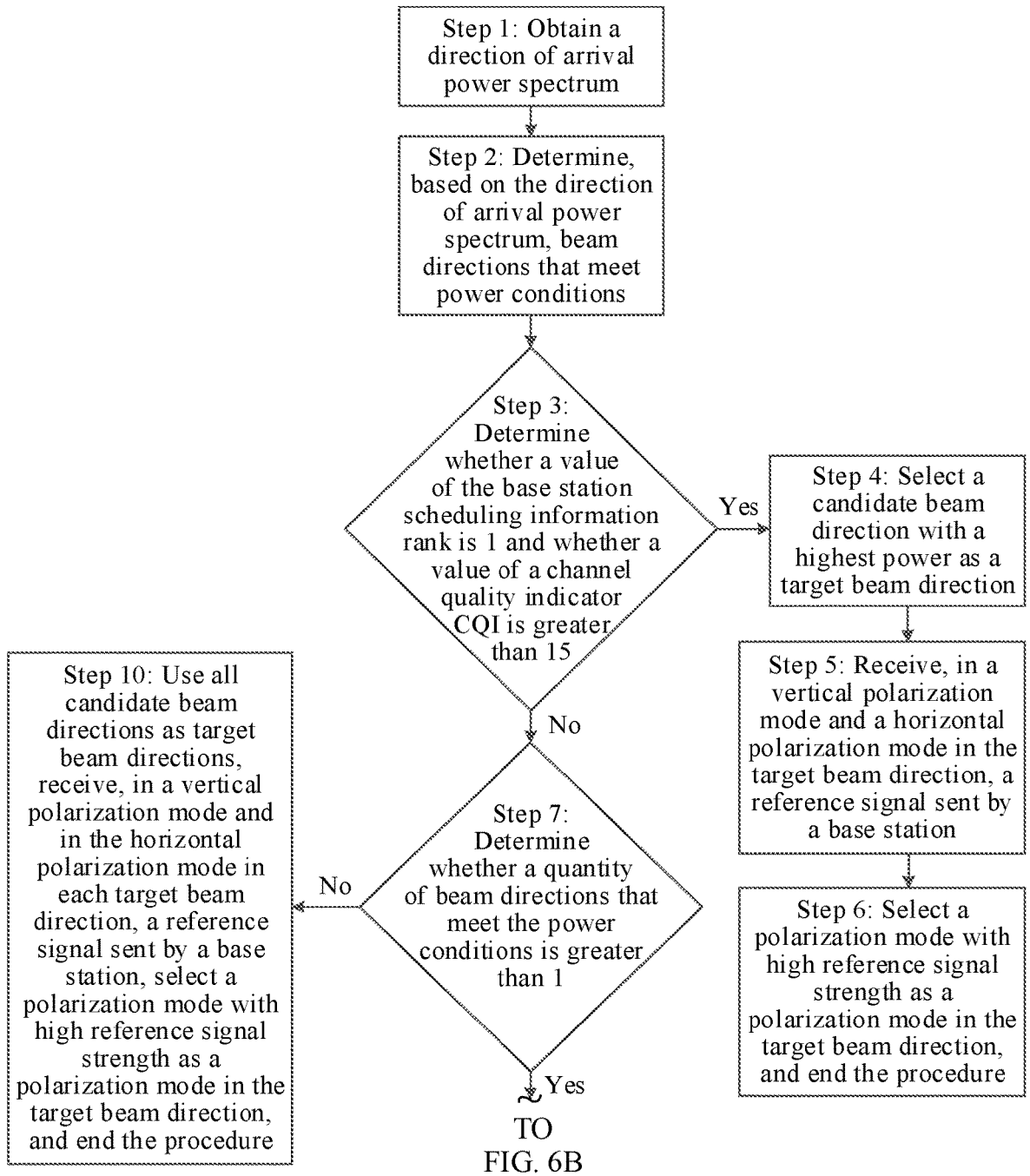
FIG. 6A and FIG. 6B are schematic comprehensive flowcharts of a beam configuration method according to this application.
Figure 6B:
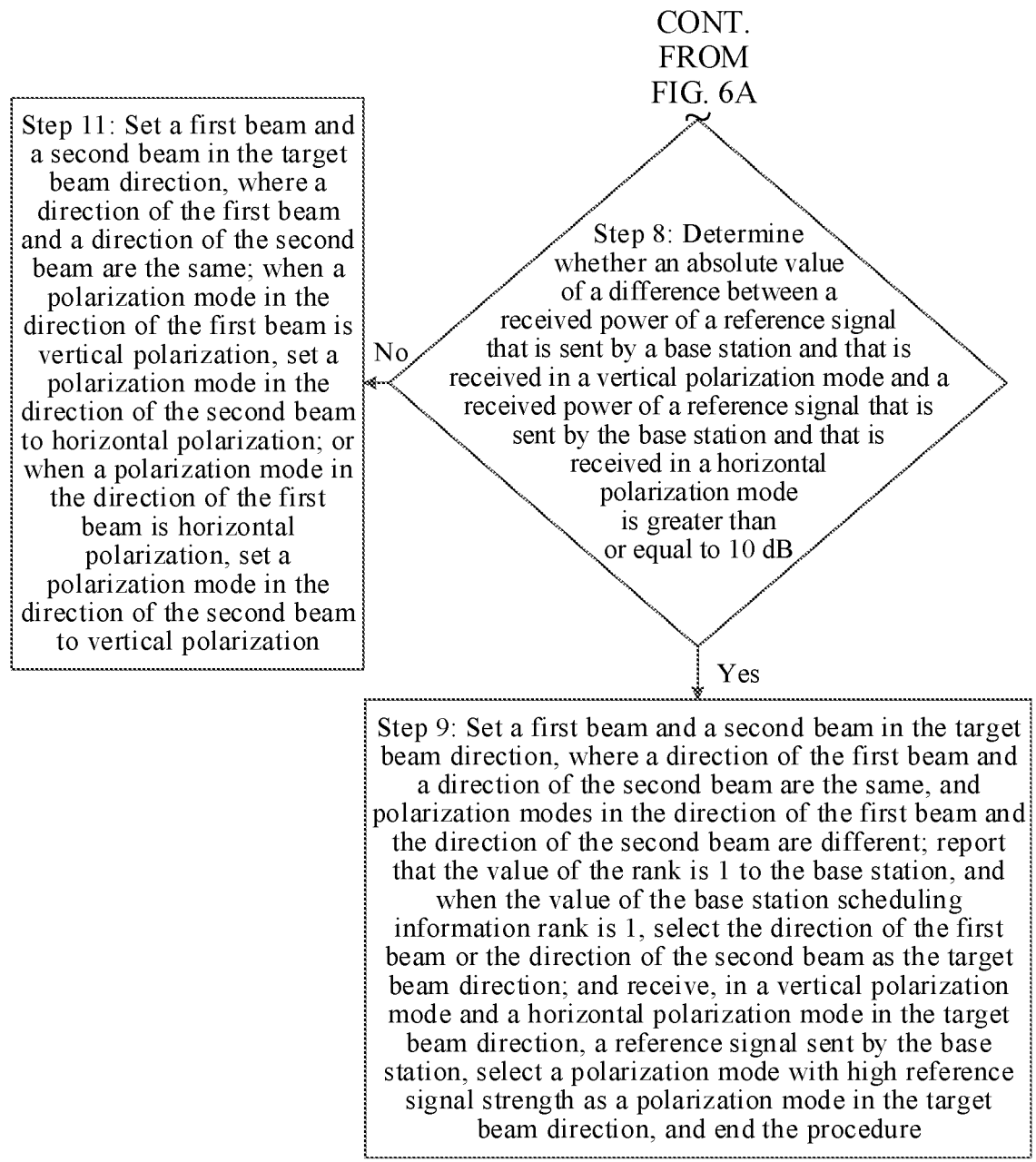

For example, FIG. 6A and FIG. 6B are schematic comprehensive flowcharts of a beam configuration method according to this application. As shown in FIG. 6A and FIG. 6B, the method may include the following steps.

Step 1: Obtain a direction of arrival power spectrum.

Step 2: Determine, based on the direction of arrival power spectrum, beam directions that meet power conditions.

In this embodiment, a quantity of candidate beams is determined based on an upper limit of a quantity of beams that are simultaneously supported by a terminal and a quantity of beams that meet the power conditions. The quantity of candidate beams is a minimum value of the upper limit of the quantity of beams that are simultaneously supported by the terminal and the quantity of beams that meet the power conditions. A candidate beam direction is selected, based on the quantity of candidate beams in descending order of powers, from the beam directions that meet the power conditions.

Step 3: Determine whether a value of the base station scheduling information rank is 1 and whether a value of a channel quality indicator CQI is greater than 15. If the value of the base station scheduling information rank is 1 and the value of the channel quality indicator CQI is greater than 15, step 4 is performed. If the value of the base station scheduling information rank is not 1 and/or the value of the channel quality indicator CQI is not greater than 15, step 7 is performed.

Step 4: Select a candidate beam direction with a strongest power as a target beam direction.

Step 5: Receive, in a vertical polarization mode and a horizontal polarization mode in the target beam direction, a reference signal sent by a base station.

Step 6: Select a polarization mode with high reference signal strength as a polarization mode in the target beam direction, and end the procedure.

Step 7: Determine whether a quantity of beam directions that meet the power conditions is greater than 1. If the quantity is equal to 1, step 8 is performed. If the quantity is greater than 1, step 10 is performed.

Step 8: Determine whether an absolute value of a difference between a received power of a reference signal that is sent by the base station and that is received in a vertical polarization mode and a received power of a reference signal that is sent by the base station and that is received in a horizontal polarization mode is greater than or equal to 10 dB. If the absolute value is less than 10 dB, step 11 is performed. If the absolute value is greater than or equal to 10 dB, step 9 is performed.

Step 9: Set a first beam and a second beam in the target beam direction, where a direction of the first beam and a direction of the second beam are the same, and polarization modes in the direction of the first beam and the direction of the second beam are different; report that the value of the rank is 1 to the base station, and when the value of the base station scheduling information rank is 1, select the direction of the first beam or the direction of the second beam as the target beam direction; and receive, in a vertical polarization mode and a horizontal polarization mode in the target beam direction, a reference signal sent by the base station, select a polarization mode with high reference signal strength as a polarization mode in the target beam direction, and end the procedure.

Step 10: Use all candidate beam directions as target beam directions, receive, in a vertical polarization mode and a horizontal polarization mode in each target beam direction, a reference signal sent by the base station, select a polarization mode with high reference signal strength as a polarization mode in the target beam direction, and end the procedure.

Step 11: Set a first beam and a second beam in the target beam direction, where a direction of the first beam and a direction of the second beam are the same; when a polarization mode in the direction of the first beam is vertical polarization, set a polarization mode in the direction of the second beam to horizontal polarization; or when a polarization mode in the direction of the first beam is horizontal polarization, set a polarization mode in the direction of the second beam to vertical polarization.

It should be noted that, in step 3 in this embodiment, a criterion for determining the value of the channel quality indicator CQI is set to 15. In actual application, different values may be set based on specific application scenarios. In step 8, in this embodiment, the absolute value of the difference between the received power of the reference signal that is sent by the base station and that is received in a vertical polarization mode and the received power of the reference signal that is sent by the base station and that is received in a horizontal polarization mode is set to 10 dB. In actual application, different values may be set based on specific application scenarios. Values of specific parameters are not limited in this embodiment.

In this embodiment, a beam direction and a beam polarization mode are flexibly configured, to reduce power consumption, improve a transmission rate of UE, and reduce a probability of link and beam failure. The quantity of beams is determined based on a network scheduling status and channel quality. In this way, a quantity of channels can be flexibly selected to reduce power consumption. When two beams are used, beams in different directions may be used based on channel quality, to effectively reduce a probability of a failure of beam failure recovery, especially when the UE moves. When two beams are used, flexible polarization configuration is used based on channel quality, so that a transmission rate of the UE can be increased, and the number of streams can be increased.

In this embodiment, the base station scheduling information rank is determined, and the direction of arrival power spectrum is determined. The peak information is determined based on the direction of arrival power spectrum. The beam directions that meet the power conditions are determined based on the peak information. The at least one candidate beam direction is selected, based on the preset filtering condition, from the beam directions that meet the power conditions. The target beam direction of the terminal is determined from the at least one candidate beam direction based on the base station scheduling information rank, the value of the channel quality indicator CQI, and the direction of arrival power spectrum. In this way, the beam configuration manner on a terminal side is more flexible, to meet requirements of different service scenarios, and improve stability of a communications link.

Figure 7:
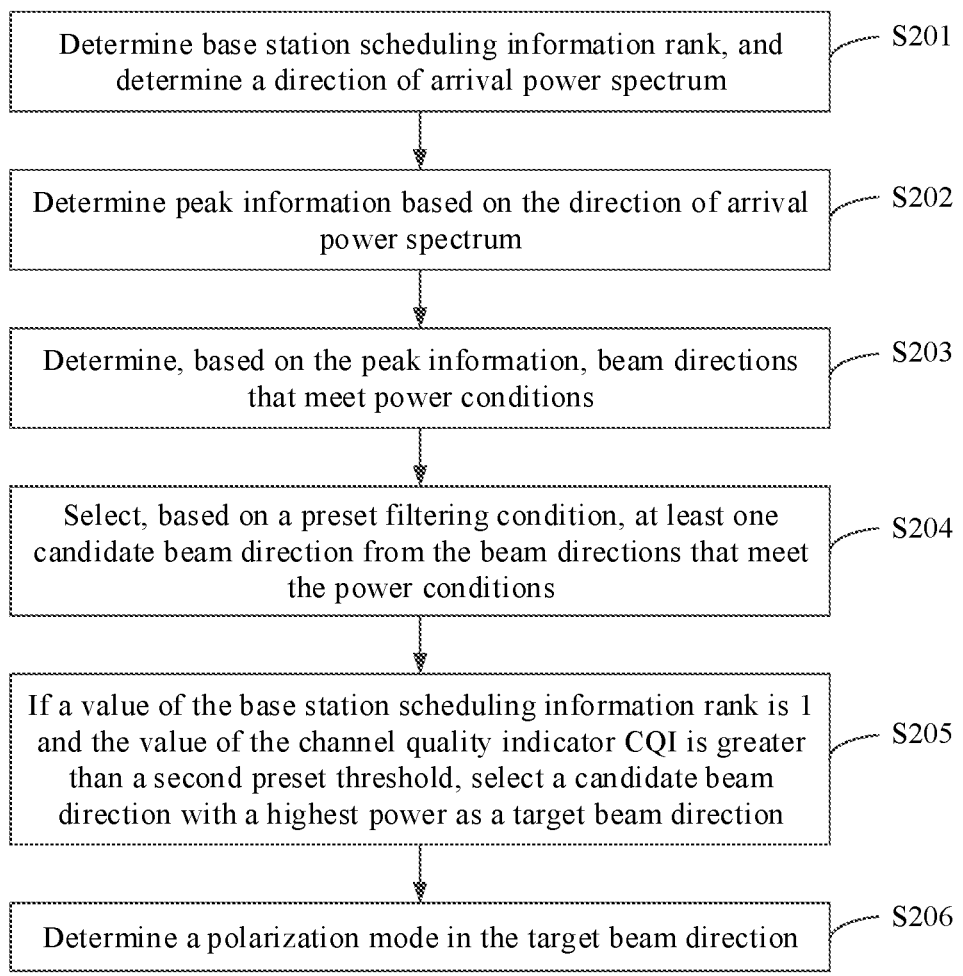
FIG. 7 is a schematic flowchart of a beam configuration method according to another embodiment of this application.

FIG. 7 is a schematic flowchart of a beam configuration method according to another embodiment of this application. As shown in FIG. 7, this embodiment may include the following steps.

Step S201: Determine base station scheduling information rank, and determine a direction of arrival power spectrum.

Step S202: Determine peak information based on the direction of arrival power spectrum.

Step S203: Determine, based on the peak information, beam directions that meet power conditions.

Step S204: Select, based on a preset filtering condition, at least one candidate beam direction from the beam directions that meet the power conditions.

In this embodiment, specific implementation processes and implementation principles of step S201 to step S204 are similar to those of step S101 to step S104 in Embodiment 1. Details are not described herein again.

Step S205: If a value of the base station scheduling information rank is 1 and the value of the channel quality indicator CQI is greater than a second preset threshold, select a candidate beam direction with a strongest power as a target beam direction.

In this embodiment, when the base station schedules a single stream, and the value of the signal quality indicator CQI is greater than the second preset threshold, the candidate beam direction with the strongest power is selected as the target beam direction. This is because when the base station schedules the single stream and has good signal quality, stability of a communications link of the base station is very good. In this case, a signal sent by the base station can be stably received by selecting the candidate beam direction with the strongest power.

It should be noted that a specific value of the second preset threshold is not limited in this embodiment. The value of the second preset threshold may be adjusted in different application scenarios or service requirements. In this embodiment, the second preset threshold may be set to 15.

Step S206: Determine a polarization mode in the target beam direction.

In this embodiment, the reference signal sent by the base station is received in a vertical polarization mode and a horizontal polarization mode in the target beam direction. A received power $RSRP\_\{V\}$ of the reference signal in a vertical polarization direction and a received power $RSRP\{H\}$ of the reference signal in a horizontal polarization direction are obtained. The polarization mode in the target beam direction is determined based on $\max(RSRP\_\{H\}, RSRP\_\{V\})$. If the received power in the vertical polarization mode is greater than the received power in the horizontal polarization mode, the polarization mode in the target beam direction is set to vertical polarization. If the received power in the horizontal polarization mode is greater than the received power in the vertical polarization mode, the polarization mode in the target beam direction is set to horizontal polarization.

In this embodiment, the base station scheduling information rank is determined, and the direction of arrival power spectrum is determined. The beam directions that meet the power conditions are determined based on the peak information. The at least one candidate beam direction is selected, based on the preset filtering condition, from the beam directions that meet the power conditions. If a value of the base station scheduling information rank is 1, and the value of the channel quality indicator CQI is greater than the second preset threshold, a candidate beam direction with a strongest power is selected as the target beam direction, and finally the polarization mode in the target beam direction is determined. In this way, the beam direction configuration manner on a terminal side is more flexible, to meet requirements of different service scenarios, and improve stability of a communications link. After the target beam direction is determined, the polarization mode may be further selected based on the powers of the reference signal received in vertical polarization and horizontal polarization in the target beam direction, to improve a data transmission effect.

Figure 8:
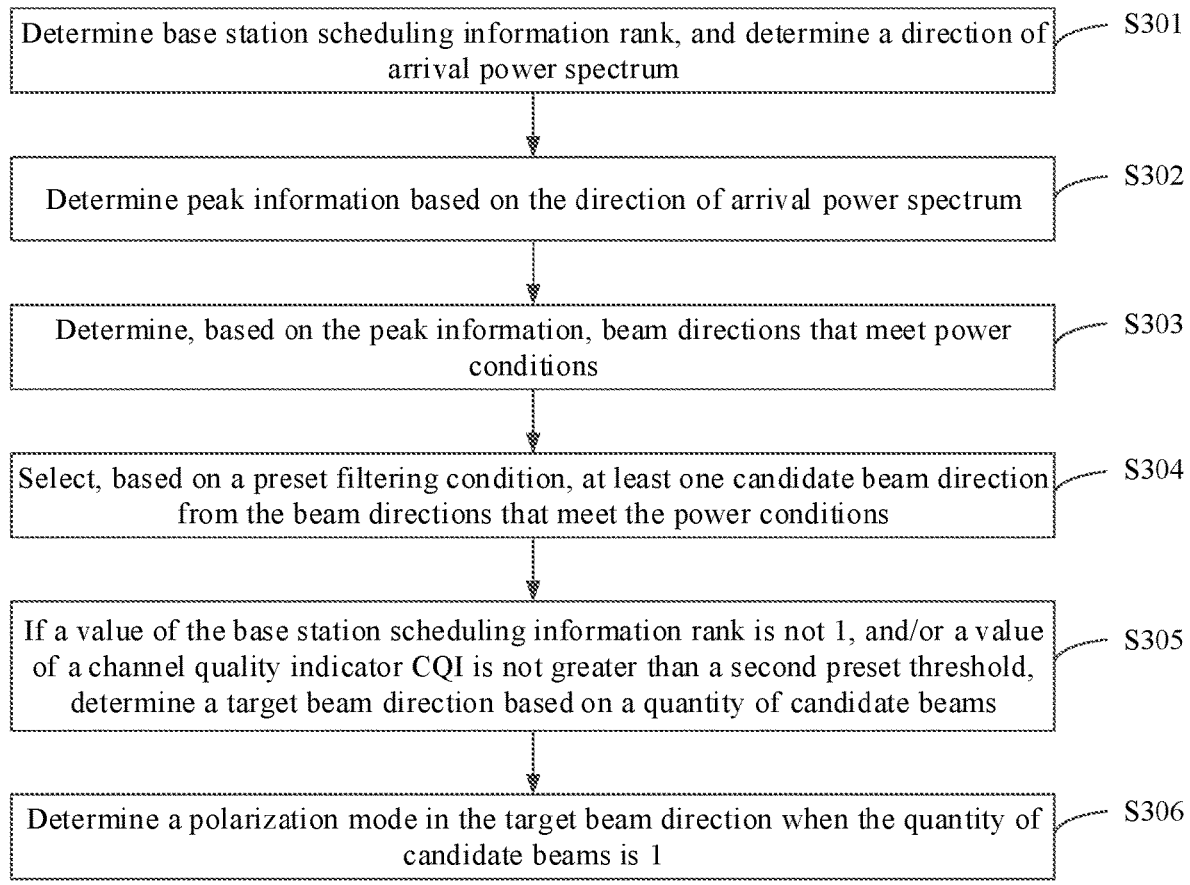
FIG. 8 is a schematic flowchart of a beam configuration method according to still another embodiment of this application.

FIG. 8 is a schematic flowchart of a beam configuration method according to still another embodiment of this application. As shown in FIG. 8, this embodiment may include the following steps.

Step S301: Determine base station scheduling information rank, and determine a direction of arrival power spectrum.

Step S302: Determine peak information based on the direction of arrival power spectrum.

Step S303: Determine, based on the peak information, beam directions that meet power conditions.

Step S304: Select, based on a preset filtering condition, at least one candidate beam direction from the beam directions that meet the power conditions.

In this embodiment, specific implementation processes and implementation principles of step S301 to step S304 are similar to those of step S101 to step S104 in Embodiment 1. Details are not described herein again.

Step S305: If a value of the base station scheduling information rank is not 1, and/or a value of a channel quality indicator CQI is not greater than a second preset threshold, determine a target beam direction based on a quantity of candidate beams.

In this embodiment, when a base station does not schedule a single stream, and/or the value of the channel quality indicator CQI is not greater than the second preset threshold, the target beam direction is determined based on the quantity of candidate beams. In this case, if the quantity of candidate beams is 1, the candidate beam direction is used as the target beam direction.

Step S306: Determine a polarization mode in the target beam direction when the quantity of candidate beams is 1.

In this embodiment, a reference signal sent by the base station is received in a vertical polarization mode and a horizontal polarization mode in the target beam direction. A received power $RSRP\_\{V\}$ of the reference signal in a vertical polarization direction and a received power $RSRP\{H\}$ of the reference signal in a horizontal polarization direction are obtained. Then, the polarization mode in the target beam is determined based on the received power $RSRP\_\{V\}$ of the reference signal in the vertical polarization direction and the received power $RSRP\{H\}$ of the reference signal in the horizontal polarization direction.

In a possible implementation, if an absolute value of a difference between the $RSRP\_\{V\}$ and the $RSRP\{H\}$ is greater than a third preset threshold, a first beam and a second beam are set in the target beam direction. A direction of the first beam and a direction of the second beam are the same, and polarization modes in the direction of the first beam and the direction of the second beam are different. That the value of the rank is 1 is reported to the base station, and when the value of the base station scheduling information rank is 1, the direction of the first beam or the direction of the second beam is selected as the target beam direction. The polarization mode in the target beam direction is determined based on $\max(RSRP\_\{H\}, RSRP\_\{V\})$. If the received power in the vertical polarization mode is greater than the received power in the horizontal polarization mode, the polarization mode in the target beam direction is set to vertical polarization. If the received power in the horizontal polarization mode is greater than the received power in the vertical polarization mode, the polarization mode in the target beam direction is set to horizontal polarization.

In another possible implementation, if an absolute value of a difference between the $RSRP\_\{V\}$ and the $RSRP\{H\}$ is not greater than a third preset threshold, a first beam and a second beam are set in the target beam direction. A direction of the first beam and a direction of the second beam are the same. When a polarization mode in the direction of the first beam is vertical polarization, a polarization mode in the direction of the second beam is set to horizontal polarization. Alternatively, when a polarization mode in the direction of the first beam is horizontal polarization, a polarization mode in the direction of the second beam is set to vertical polarization.

In this embodiment, when two different target beam directions are used, a probability of a failure of beam failure recovery can be effectively reduced especially when the terminal side moves, and stability and robustness of transmission on a communications link can be ensured.

In this embodiment, the base station scheduling information rank is determined, and the direction of arrival power spectrum is determined. The beam directions that meet the power conditions are determined based on the peak information. The at least one candidate beam direction is selected, based on the preset filtering condition, from the beam directions that meet the power conditions. If a value of the base station scheduling information rank is not 1, and/or the value of the channel quality indicator CQI is not greater than the second preset threshold, the target beam direction is determined based on the quantity of candidate beams, and finally the polarization mode in the target beam direction is determined. In this way, a beam direction configuration manner on a terminal side is more flexible, to meet requirements of different service scenarios, and improve stability of a communications link. After the target beam direction is determined, the polarization mode may be further selected based on the powers of the reference signal received in vertical polarization and horizontal polarization in the target beam direction, to improve a data transmission effect.

Figure 9:
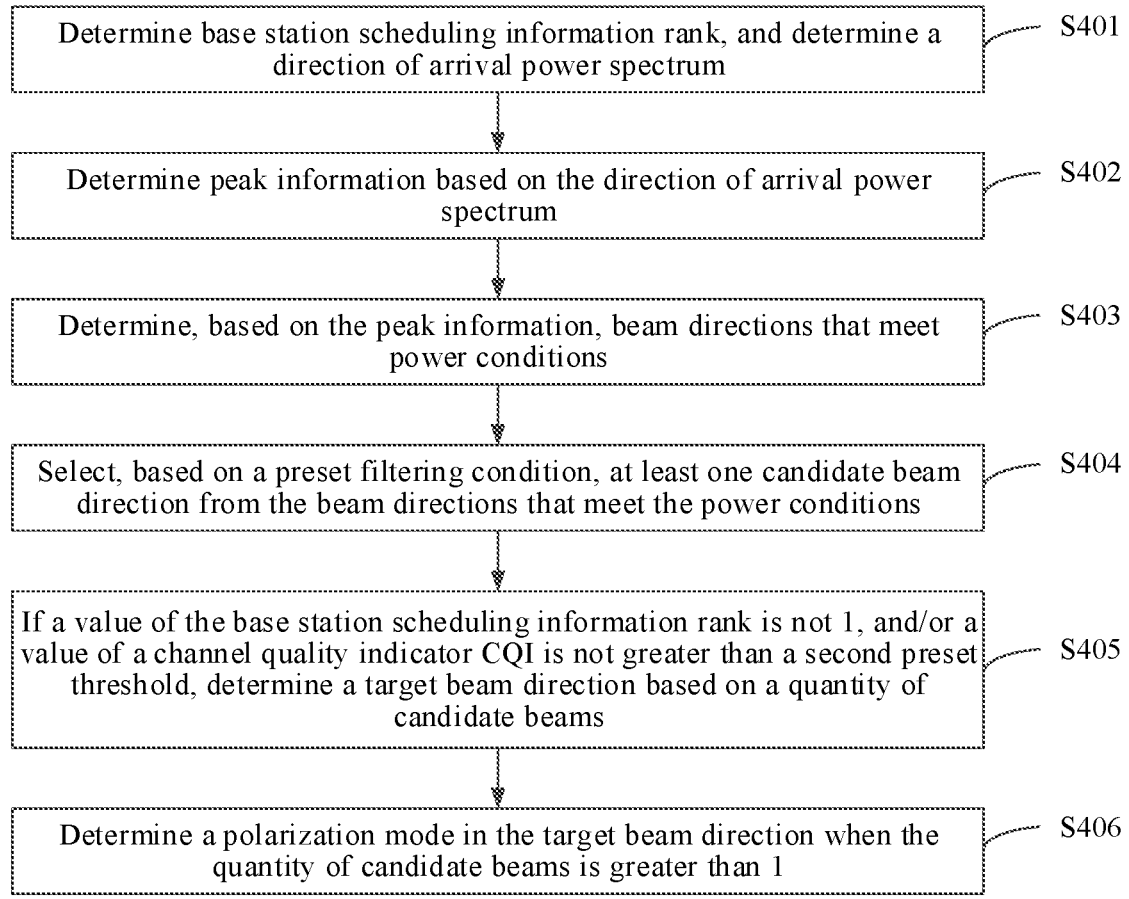
FIG. 9 is a schematic flowchart of a beam configuration method according to yet another embodiment of this application.

FIG. 9 is a schematic flowchart of a beam configuration method according to yet another embodiment of this application. As shown in FIG. 9, this embodiment may include the following steps.

Step S401: Determine base station scheduling information rank, and determine a direction of arrival power spectrum.

Step S402: Determine peak information based on the direction of arrival power spectrum.

Step S403: Determine, based on the peak information, beam directions that meet power conditions.

Step S404: Select, based on a preset filtering condition, at least one candidate beam direction from the beam directions that meet the power conditions.

In this embodiment, specific implementation processes and implementation principles of step S401 to step S404 are similar to those of step S101 to step S104 in Embodiment 1. Details are not described herein again.

Step S405: If a value of the base station scheduling information rank is not 1, and/or a value of a channel quality indicator CQI is not greater than a second preset threshold, determine a target beam direction based on a quantity of candidate beams.

In this embodiment, when a base station does not schedule a single stream, and/or the value of the channel quality indicator CQI is not greater than the second preset threshold, the target beam direction is determined based on the quantity of candidate beams. In this case, if the quantity of candidate beams is greater than 1, all candidate beam directions are used as target beam directions.

Step S406: Determine polarization modes in the target beam directions when the quantity of candidate beams is greater than 1.

In this embodiment, if the quantity of candidate beams is greater than 1, a reference signal sent by the base station is received in a vertical polarization mode and a horizontal polarization mode in each target beam direction. A received power $RSRP\_\{V\}$ of the reference signal in a vertical polarization direction and a received power $RSRP\{H\}$ of the reference signal in a horizontal polarization direction are obtained. A polarization mode in each target beam direction is determined based on $\max(RSRP\_\{H\}, RSRP\_\{V\})$. If the received power in the vertical polarization mode is greater than the received power in the horizontal polarization mode, the polarization mode in the target beam direction is set to vertical polarization. If the received power in the horizontal polarization mode is greater than the received power in the vertical polarization mode, the polarization mode in the target beam direction is set to horizontal polarization.

In this embodiment, when two or more target beam directions are used, flexible polarization configuration may be performed based on channel quality, to increase the number of data streams, so as to improve a data transmission rate between a terminal and the base station.

In this embodiment, the base station scheduling information rank is determined, and the direction of arrival power spectrum is determined. The beam directions that meet the power conditions are determined based on the peak information. The at least one candidate beam direction is selected, based on the preset filtering condition, from the beam directions that meet the power conditions. If a value of the base station scheduling information rank is not 1, and/or the value of the channel quality indicator CQI is not greater than the second preset threshold, the target beam direction is determined based on the quantity of candidate beams, and finally the polarization mode in the target beam direction is determined. In this way, a beam direction configuration manner on a terminal side is more flexible, to meet requirements of different service scenarios, and improve stability of a communications link. After the target beam direction is determined, the polarization mode may be further selected based on the powers of the reference signal received in vertical polarization and horizontal polarization in the target beam direction, to improve a data transmission effect.

Figure 10:
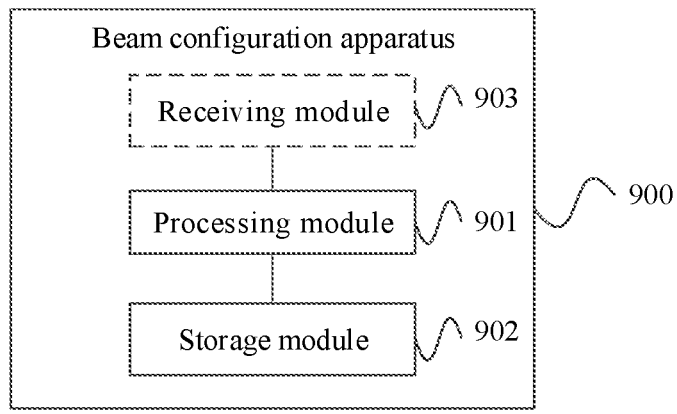
FIG. 10 is a schematic diagram of a structure of a beam configuration apparatus according to an embodiment of this application.

FIG. 10 is a schematic diagram of a structure of a beam configuration apparatus according to an embodiment of this application. As shown in FIG. 10, a beam configuration apparatus 900 in this embodiment may include a processing module 901 and a storage module 902, where the storage module 902 is configured to be coupled to the processing module 901, and store necessary program instructions and data.

The processing module 901 is configured to:
  determine base station scheduling information rank, and determine a direction of arrival power spectrum;
  determine peak information based on the direction of arrival power spectrum;
  determine, based on the peak information, beam directions that meet power conditions;
  select, based on a preset filtering condition, at least one candidate beam direction from the beam directions that meet the power conditions; and
  determine a target beam direction of a terminal from the at least one candidate beam direction based on the base station scheduling information rank, a value of a channel quality indicator CQI, and the direction of arrival power spectrum.

Optionally, the apparatus further includes:
  a receiving module 903, configured to receive the base station scheduling information rank sent by a base station.

Optionally, the processing module 901 is further configured to:
  when a direction of a beam that is transmitted by a base station is fixed, obtain reference signal received powers in different beam directions, where the reference signal received powers in the different beam directions form the direction of arrival power spectrum.

Optionally, the processing module 901 is further configured to:
  obtain the direction of arrival power spectrum through beam sweeping, or obtain the direction of arrival power spectrum through non-coherent channel estimation.

Optionally, the peak information includes peak powers, a maximum peak power, and an angular distance between adjacent peak powers.

Optionally, the power conditions are: A peak power is greater than rsrp-ThresholdSSB in an RRC higher layer parameter RACH-ConfigCommon, an absolute value of a difference between the peak power and the maximum peak power is less than or equal to a first preset threshold, and the angular distance between adjacent peak powers is greater than a beam direction corresponding to a peak power of a beam width of the terminal.

Optionally, the processing module 901 is further configured to:
  determine a quantity of candidate beams based on an upper limit of a quantity of beams that are simultaneously supported by the terminal and a quantity of beams that meet the power conditions, where the quantity of candidate beams is a minimum value of the upper limit of the quantity of beams that are simultaneously supported by the terminal and the quantity of beams that meet the power conditions; and select, based on the quantity of candidate beams in descending order of powers, the candidate beam direction from the beam directions that meet the power conditions.

Optionally, the processing module 901 is further configured to:
  if a value of the base station scheduling information rank is 1 and the value of the channel quality indicator CQI is greater than a second preset threshold, select a candidate beam direction with a strongest power as the target beam direction.

Optionally, the processing module 901 is further configured to:
  receive, in a vertical polarization mode and a horizontal polarization mode in the target beam direction, a reference signal sent by the base station;
  obtain a received power $RSRP\_\{V\}$ of the reference signal in a vertical polarization direction and a received power $RSRP\{H\}$ of the reference signal in a horizontal polarization direction; and
  determine the polarization mode in the target beam direction based on $\max(RSRP\_\{H\}, RSRP\_\{V\})$.

Optionally, the processing module 901 is further configured to:
  if a value of the base station scheduling information rank is not 1, and/or the value of the channel quality indicator CQI is not greater than a second preset threshold, determine the target beam direction based on the quantity of candidate beams.

Optionally, the determining the target beam direction based on the quantity of candidate beams includes:
  if the quantity of candidate beams is 1, using the candidate beam direction as the target beam direction.

Optionally, the processing module 901 is further configured to:
  receive, in a vertical polarization mode and a horizontal polarization mode in the target beam direction, a reference signal sent by the base station; and
  obtain a received power $RSRP\_\{V\}$ of the reference signal in a vertical polarization direction and a received power $RSRP\{H\}$ of the reference signal in a horizontal polarization direction.

Optionally, the processing module 901 is further configured to:
  if an absolute value of a difference between the $RSRP\_\{V\}$ and the $RSRP\_\{H\}$ is greater than a third preset threshold, set a first beam and a second beam in the target beam direction, where a direction of the first beam and a direction of the second beam are the same, and polarization modes in the direction of the first beam and the direction of the second beam are different;
  report that the value of the rank is 1 to the base station, and when the value of the base station scheduling information rank is 1, select the direction of the first beam or the direction of the second beam as the target beam direction; and
  determine the polarization mode in the target beam direction based on $\max(RSRP\_\{H\}, RSRP\_\{V\})$.

Optionally, the processing module 901 is further configured to:
  if an absolute value of a difference between the $RSRP\_\{V\}$ and the $RSRP\{H\}$ is not greater than a third preset threshold, set a first beam and a second beam in the target beam direction,
  where a direction of the first beam and a direction of the second beam are the same; when a polarization mode in the direction of the first beam is vertical polarization, set a polarization mode in the direction of the second beam to horizontal polarization; or when a polarization mode in the direction of the first beam is horizontal polarization, set a polarization mode in the direction of the second beam to vertical polarization.

Optionally, the determining the target beam direction based on the quantity of candidate beams includes:
  if the quantity of candidate beams is greater than 1, using all candidate beam directions as target beam directions.

Optionally, the processing module 901 is further configured to:
  receive, in a vertical polarization mode and a horizontal polarization mode in each target beam direction, a reference signal sent by the base station;
  obtain a received power $RSRP\_\{V\}$ of the reference signal in a vertical polarization direction and a received power $RSRP\{H\}$ of the reference signal in a horizontal polarization direction; and
  determine a polarization mode in each target beam direction based on $\max(RSRP\_\{H\}, RSRP\_\{V\})$.

The beam configuration apparatus in this embodiment may be configured to execute the technical solutions of the terminal in the foregoing method embodiments. Their implementation principles and technical effects are similar, and are not described herein again.

It should be noted that, in the embodiments of this application, division into the modules is an example, and is merely logical function division. In actual implementation, another division manner may be used. Functional modules in the embodiments of this application may be integrated into one processing module, or each of the modules may exist alone physically, or two or more modules are integrated into one module. The integrated module may be implemented in a form of hardware, or may be implemented in a form of a software functional module.

If the integrated module is implemented in the form of a software functional module and sold or used as an independent product, the integrated unit may be stored in a computer-readable storage medium. Based on such an understanding, the technical solutions of this application essentially, or the part contributing to the conventional technology, or all or some of the technical solutions may be implemented in the form of a software product. The computer software product is stored in a storage medium and includes several instructions for instructing a computer device (which may be a personal computer, a server, a network device, or the like) or a processor to perform all or some of the steps of the methods in the embodiments of this application. The foregoing storage medium includes: any medium that can store program code, such as a USB flash drive, a removable hard disk, a read-only memory (ROM), a random access memory (RAM), a magnetic disk, or an optical disc.

Figure 11:
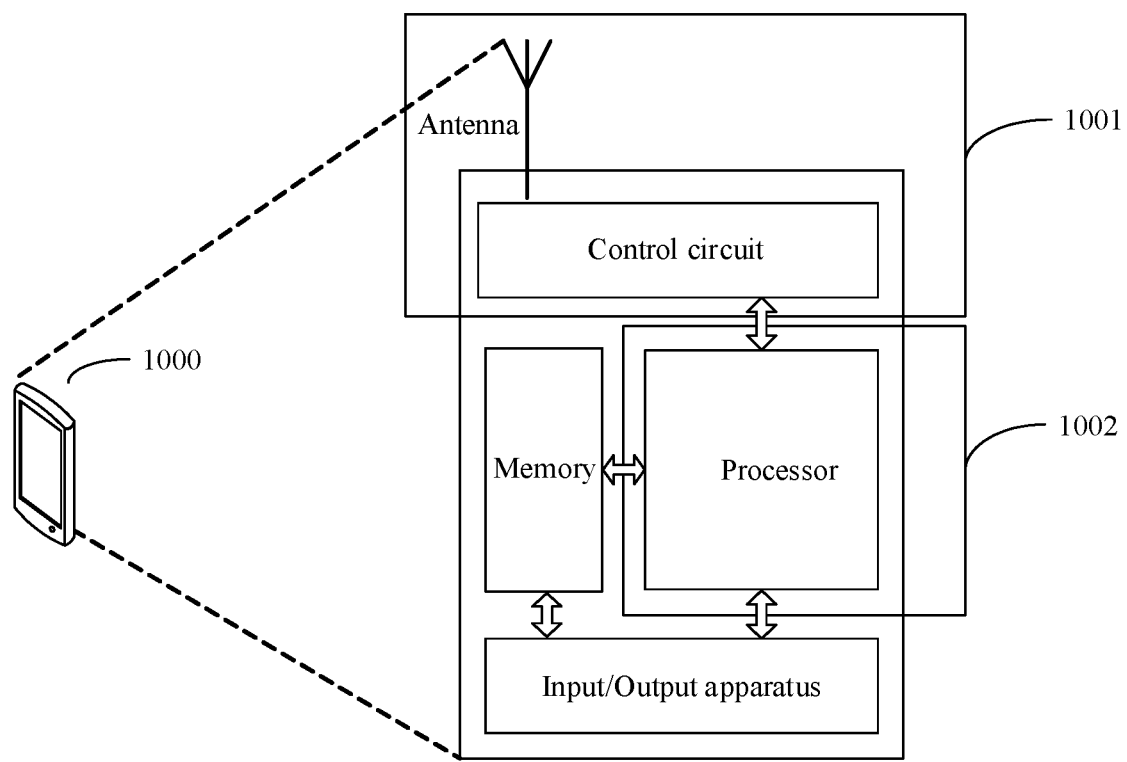
FIG. 11 is a schematic diagram of a structure of a terminal according to an embodiment of this application.

FIG. 11 is a schematic structural diagram of a terminal according to an embodiment of this application. As shown in FIG. 11, a terminal 1000 in this embodiment may include a processor, a memory, a control circuit, an antenna, and an input/output apparatus. The processor is mainly configured to: process a communication protocol and communication data, control the entire terminal, execute a software program, and process data of the software program. The memory is mainly configured to store the software program and the data. The radio frequency circuit is mainly configured to: perform conversion between a baseband signal and a radio frequency signal, and process the radio frequency signal. The antenna is mainly configured to send and receive a radio frequency signal in an electromagnetic wave form. The input/output apparatus, such as a touchscreen, a display screen, and a keyboard, is mainly configured to receive data input by a user and output data to the user.

After the terminal is powered on, the processor may read a software program in a storage unit, explain and execute instructions of the software program, and process data of the software program. When data needs to be sent in a wireless manner, after performing baseband processing on the to-be-sent data, the processor outputs a baseband signal to a radio frequency circuit. After performing radio frequency processing on the baseband signal, the radio frequency circuit sends a radio frequency signal in a form of an electromagnetic wave through the antenna. When data is sent to the terminal, the radio frequency circuit receives a radio frequency signal through the antenna, converts the radio frequency signal into a baseband signal, and outputs the baseband signal to the processor. The processor converts the baseband signal into data, and processes the data.

A person skilled in the art may understand that for ease of description, FIG. 11 shows only one memory and only one processor. An actual terminal may include a plurality of processors and a plurality of memories. The memory may also be referred to as a storage medium, a storage device, or the like. This is not limited in this embodiment of this application.

In a possible design, the processor may alternatively store instructions or data (for example, intermediate data). The instructions may be run by the processor, so that the terminal 1000 performs the method corresponding to the terminal described in the foregoing method embodiments.

In still another possible design, the terminal 1000 may include a circuit. The circuit may implement the sending, receiving, or communication function in the foregoing method embodiments.

Optionally, the terminal 1000 may include one or more memories, where the memory may store instructions, and the instructions may be run on the processor, so that the terminal 1000 performs the method described in the foregoing method embodiments.

Optionally, the memory may also store data. The processor and the memory may be separately disposed, or may be integrated together.

Optionally, the terminal 1000 may further include a transceiver and/or an antenna, configured to implement a transceiver function of a communications apparatus.

In an optional implementation, the processor may include a baseband processor and a central processing unit. The baseband processor is mainly configured to process a communication protocol and communication data, and the central processing unit is mainly configured to: control the entire terminal, execute a software program, and process data of the software program. The processor in FIG. 11 is integrated with functions of the baseband processor and the central processing unit. A person skilled in the art may understand that the baseband processor and the central processing unit may alternatively be independent processors, and are interconnected by using a technology such as a bus. A person skilled in the art may understand that the terminal may include a plurality of baseband processors to adapt to different network standards, and the terminal may include a plurality of central processing units to enhance a processing capability of the terminal. The components in the terminal may be connected by using various buses. The baseband processor may alternatively be expressed as a baseband processing circuit or a baseband processing chip. The central processing unit may alternatively be expressed as a central processing circuit or a central processing chip. A function of processing the communication protocol and the communication data may be built in the processor, or may be stored in the storage unit in a form of software program. The processor executes the software program to implement a baseband processing function.

In an example, the antenna and the control circuit that have a transceiver function may be considered as a transceiver module 1001 of the terminal 1000, and the processor having a processing function may be considered as a processing module 1002 of the terminal 1000. As shown in FIG. 11, the terminal 1000 includes the transceiver module 1001 and the processing module 1002. The transceiver module may also be referred to as a transceiver, a transceiver machine, a transceiver apparatus, or the like. Optionally, a component that is configured to implement a receiving function and that is in the transceiver module 1001 may be considered as a receiving module, and a component that is configured to implement a sending function and that is in the transceiver module 1001 may be considered as a sending module. That is, the transceiver module 1001 includes the receiving module and the sending module. The receiving module may also be referred to as a receiver, a receiver machine, a receiver circuit, or the like. The sending module may be referred to as a transmitter, a transmitter machine, a transmitter circuit, or the like.

The processor and the transceiver described in this embodiment may be implemented on an integrated circuit (IC), an analog IC, a radio frequency integrated circuit (RFIC), a hybrid signal IC, an application-specific integrated circuit (ASIC), a printed circuit board (PCB), an electronic device, or the like. The processor and the transceiver may also be manufactured by using various 1C technologies, for example, a complementary metal oxide semiconductor (CMOS), an N-type metal oxide semiconductor (NMOS), a P-type metal oxide semiconductor (PMOS), a bipolar junction transistor (BJT), a bipolar CMOS (BiCMOS), silicon germanium (SiGe), and gallium arsenide (GaAs).

All or some of the foregoing embodiments may be implemented through software, hardware, firmware, or any combination thereof. When the embodiments are implemented by using the software, all or some of the embodiments may be implemented in a form of a computer program product. The computer program product includes one or more computer instructions. When the computer program instructions are loaded and executed on a computer, all or some of the procedures or functions according to the embodiments of this application are generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, DVD), a semiconductor medium (for example, a solid state drive (SSD)), or the like.

What is claimed is:

1. A beam configuration method, applied to a beam configuration apparatus, the method comprising:
   determining base station scheduling information rank, and determining a direction of arrival power spectrum;
   determining peak information based on the direction of arrival power spectrum;
   determining, based on the peak information, beam directions that meet power conditions;
   selecting, based on a preset filtering condition, at least one candidate beam direction from the beam directions that meet the power conditions; and
   determining a target beam direction of a terminal from the at least one candidate beam direction based on the base station scheduling information rank, a value of a channel quality indicator (CQI), and the direction of arrival power spectrum.

2. The method according to claim 1, wherein determining the direction of arrival power spectrum comprises:
   in response to a direction of a beam that is transmitted by a base station being fixed, obtaining reference signal received powers in different beam directions, wherein the reference signal received powers in the different beam directions form the direction of arrival power spectrum.

3. The method according to claim 1, wherein determining the direction of arrival power spectrum comprises:
   obtaining the direction of arrival power spectrum through beam sweeping, or obtaining the direction of arrival power spectrum through non-coherent channel estimation.

4. The method according to claim 1, wherein the peak information comprises peak powers, a maximum peak power, and an angular distance between adjacent peak powers.

5. The method according to claim 1, wherein the power conditions are: a peak power is greater than rsrp-Threshold-SSB in a radio resource control (RRC) higher layer parameter RACH-ConfigCommon that is delivered by the base station to the terminal, an absolute value of a difference between the peak power and the maximum peak power is less than or equal to a first preset threshold, and an angular distance between adjacent peak powers is greater than a beam direction associated with a peak power of a beam width of the terminal.

6. The method according to claim 1, wherein selecting, based on the preset filtering condition, the at least one candidate beam direction from the beam directions that meet the power conditions comprises:
   determining a quantity of candidate beams based on an upper limit of a quantity of beams that are simultaneously supported by the terminal and a quantity of beams that meet the power conditions, wherein the quantity of candidate beams is a minimum value of the upper limit of the quantity of beams that are simultaneously supported by the terminal and the quantity of beams that meet the power conditions; and
   selecting, based on the quantity of candidate beams in descending order of powers, the candidate beam direction from the beam directions that meet the power conditions.

7. The method according to claim 1, further comprising:
   determining a polarization mode in the target beam direction based on a power relationship between horizontal polarization and vertical polarization,
   wherein determining the polarization mode in the target beam direction based on the power relationship between the horizontal polarization and vertical polarization comprises:
      receiving, in a vertical polarization mode and a horizontal polarization mode in the target beam direction, a reference signal sent by the base station;
      obtaining a received power $RSRP\_\{V\}$ of the reference signal in a vertical polarization direction and a received power $RSRP\{H\}$ of the reference signal in a horizontal polarization direction; and
      determining the polarization mode in the target beam direction based on $max(RSRP\_\{H\}, RSRP\_\{V\})$.

8. The method according to claim 1, wherein determining the target beam direction of the terminal from the at least one candidate beam direction based on the base station scheduling information rank, the value of the CQI, and the direction of arrival power spectrum comprises:
   in response to a value of the base station scheduling information rank being 1 and the value of the CQI being greater than a second preset threshold, selecting a candidate beam direction with a strongest power as the target beam direction.

9. The method according to claim 1, wherein determining the target beam direction of the terminal from the at least one candidate beam direction based on the base station scheduling information rank, the value of the CQI, and the direction of arrival power spectrum comprises:
   in response to a value of the base station scheduling information rank being not 1, and/or the value of the CQI being not greater than a second preset threshold, determining the target beam direction based on the quantity of candidate beams.

10. The method according to claim 9, further comprising:
    receiving, in a vertical polarization mode and a horizontal polarization mode in the target beam direction, a reference signal sent by the base station; and
    obtaining a received power $RSRP\_\{V\}$ of the reference signal in a vertical polarization direction and a received power $RSRP\{H\}$ of the reference signal in a horizontal polarization direction.

11. A non-transitory readable storage medium, wherein the readable storage medium stores a computer program, and when the computer program is executed, a beam configuration method is performed as follows:
- determining base station scheduling information rank, and determining a direction of arrival power spectrum;
- determining peak information based on the direction of arrival power spectrum;
- determining, based on the peak information, beam directions that meet power conditions;
- selecting, based on a preset filtering condition, at least one candidate beam direction from the beam directions that meet the power conditions; and
- determining a target beam direction of a terminal from the at least one candidate beam direction based on the base station scheduling information rank, a value of a channel quality indicator (CQI), and the direction of arrival power spectrum.

12. A beam configuration apparatus comprising:
a memory is configured to stores one or more computer programs;
one or more processors coupled to the memory for execution of the one or more computer programs to cause the apparatus perform operations including:
- determine base station scheduling information rank, and determine a direction of arrival power spectrum;
- determine peak information based on the direction of arrival power spectrum;
- determine, based on the peak information, beam directions that meet power conditions;
- select, based on a preset filtering condition, at least one candidate beam direction from the beam directions that meet the power conditions; and
- determine a target beam direction of a terminal from the at least one candidate beam direction based on the base station scheduling information rank, a value of a channel quality indicator (CQI), and the direction of arrival power spectrum.

13. The apparatus according to claim 12, wherein the operations further include:
in response to a direction of a beam that is transmitted by a base station being fixed, obtain reference signal received powers in different beam directions, wherein the reference signal received powers in the different beam directions form the direction of arrival power spectrum.

14. The apparatus according to claim 12, wherein the operations further include:
obtain the direction of arrival power spectrum through beam sweeping, or obtain the direction of arrival power spectrum through non-coherent channel estimation.

15. The apparatus according to claim 12, wherein the peak information comprises peak powers, a maximum peak power, and an angular distance between adjacent peak powers.

16. The apparatus according to claim 12, wherein the power conditions are: a peak power is greater than rsrp-ThresholdSSB in a radio resource control (RRC) higher layer parameter RACH-ConfigCommon that is delivered by the base station to the terminal, an absolute value of a difference between the peak power and the maximum peak power is less than or equal to a first preset threshold, and an angular distance between adjacent peak powers is greater than a beam direction corresponding to a peak power of a beam width of the terminal.

17. The apparatus according to claim 12, wherein the operations further include:
determine a quantity of candidate beams based on an upper limit of a quantity of beams that are simultaneously supported by the terminal and a quantity of beams that meet the power conditions,
wherein the quantity of candidate beams is a minimum value of the upper limit of the quantity of beams that are simultaneously supported by the terminal and the quantity of beams that meet the power conditions; and
select, based on the quantity of candidate beams in descending order of powers, the candidate beam direction from the beam directions that meet the power conditions.

18. The apparatus according to claim 12, wherein the operations further include:
determine a polarization mode in the target beam direction based on a power relationship between horizontal polarization and vertical polarization,
receive, in a vertical polarization mode and a horizontal polarization mode in the target beam direction, a reference signal sent by the base station;
obtain a received power $RSRP_{V}$ of the reference signal in a vertical polarization direction and a received power $RSRP_{H}$ of the reference signal in a horizontal polarization direction; and
determine the polarization mode in the target beam direction based on $\max(RSRP_{H}, RSRP_{V})$.

19. The apparatus according to claim 12, wherein the operations further include:
in response to a value of the base station scheduling information rank being 1 and the value of the CQI being greater than a second preset threshold, select a candidate beam direction with a strongest power as the target beam direction.

20. The apparatus according to claim 12, wherein the operations further include:
in response to a value of the base station scheduling information rank being not 1, and/or the value of the CQI being not greater than a second preset threshold, determine the target beam direction based on the quantity of candidate beams.

* * * * *